D. M. WARSCHAUER  3,349,174
BEAM SCANNING DEVICE
Filed Feb. 3, 1964
3 Sheets-Sheet 1
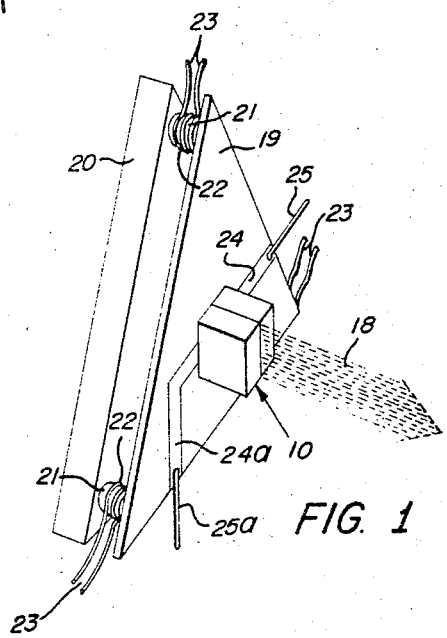
FIG. 1
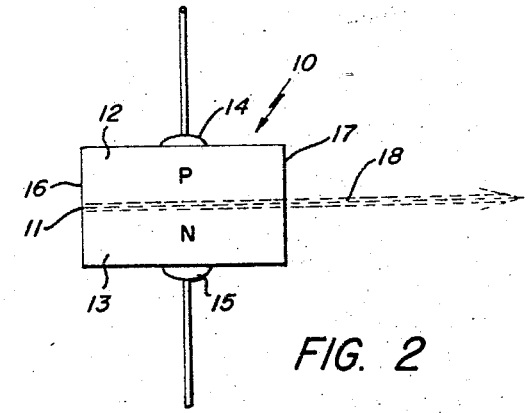
FIG. 2
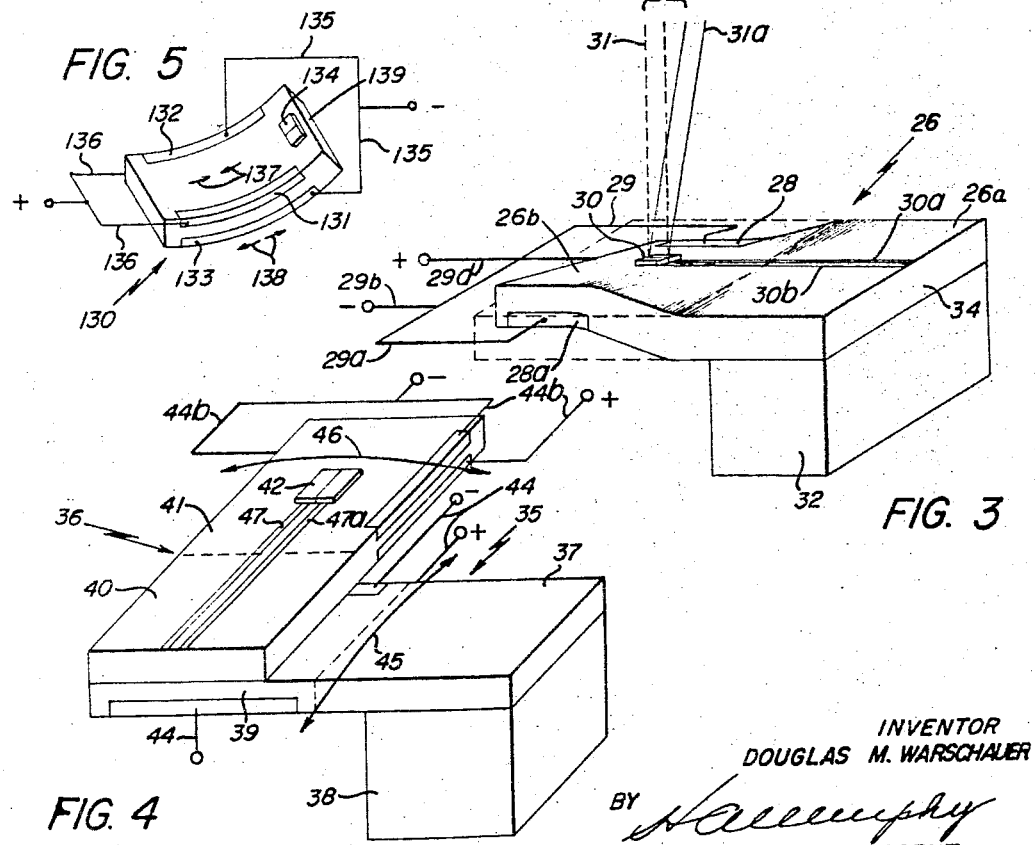
FIG. 5
FIG. 3
FIG. 4
INVENTOR
DOUGLAS M. WARSCHAUER
BY
AGENT Oct. 24, 1967    D. M. WARSCHAUER    3,349,174
BEAM SCANNING DEVICE Filed Feb. 3, 1964    3 Sheets-Sheet 2

INVENTOR
DOUGLAS M. WARSCHAUER
BY
AGENT

Oct. 24, 1967     D. M. WARSCHAUER     3,349,174
BEAM SCANNING DEVICE
Filed Feb. 3, 1964     3 Sheets-Sheet 3

INVENTOR
DOUGLAS M. WARSCHAUER
BY
AGENT

United States Patent Office 3,349,174
Patented Oct. 24, 1967

---

3,349,174
BEAM SCANNING DEVICE
Douglas M. Warschauer, Newton Center, Mass., assignor to Raytheon Company, Lexington, Mass., a corporation of Delaware
Filed Feb. 3, 1964, Ser. No. 342,175
5 Claims. (Cl. 178—7.6)

ABSTRACT OF THE DISCLOSURE

A scanning projection system comprising a semiconductor laser element for producing a beam of radiation directed along a given path, the laser element being mounted upon a support which is movable with respect to a fixed base by means of electro-strictive means between said support and base, the electrostrictive means being operated by input signals to effect movement of the support and laser element so as to scan the beam of radiation throughout a predetermined configuration. A plurality of laser elements emitting radiation of different colors and mounted to direct their respective beams onto a common focal spot are utilized to provide color reproduction in a color television system.

---

This invention relates to semiconductor laser scanning devices and has particular reference to motile electronic means for supporting one or a plurality of semiconductor laser elements whereby the laser elements may be moved in a manner such as will direct the beams radiated therefrom over a predetermined area to be scanned.

Semiconductor lasers produce beams of coherent, highly directional and rapidly modulatable radiation at optical wavelengths determined by the specific nature of the host material, its inclusions, and its degree and type of perfection. Such lasers further have the inherent characteristics of small size and mass, high degree of efficiency, and small angle of beam spread.

In accordance with the present invention, such a laser element is mounted on one or more motile elements such as piezoelectric resonators, electrostrictive rods, galvanometer units, or the like whose deflection or deformation as controlled by suitable electrical means allows the laser element to move in such a fashion as to swing the output beam of radiation through a desired spatial path. For example, by proper phase control of the motile elements, the laser beam of radiation can be made to trace a line in space, and by application of a suitable progression of signals to the motile elements a rectilinear scan can be obtained on a surface roughly perpendicular to the laser element.

The semiconductor laser element in accordance with this invention is supported by a piezoelectric crystal or other motile element of suitable configuration. For example, the element may be mounted on a suitable insulating slab supported by one or more piezoelectric resonators or electrostrictive rods which may be suitably electrically activated to contract and expand and thus introduce flexural motion in such a manner as to move the laser element as desired. In another modification of the invention, the element may be mounted on or fabricated in a piezoelectric crystal of a type capable of rotary shear whereby the beam of radiation will scan a linear path. Alternatively, angular scan in two dimensions may be accomplished by superimposing two such rotary shear crystals and causing both to be excited. According to this invention, a plurality of laser elements capable of emitting beams of different wavelengths are combined in a system to scan a single target, the elements being properly excited in modulated or pulsed fashion as scanning occurs to produce an image at the target which is a combined result of the different wavelengths of radiation impinging on the target. Such a system is applicable to certain projection systems where it is desired that the image be produced in colors or shades of color, An image produced in the above manner will be bright and sharp because of the high directionality and output intensity of the laser elements, particularly if lenses or other optical focusing means are included.

A laser scanning system including the complete projecting device with which the laser element is combined is extremely compact and small in size and is especially useful in photographic applications and infrared or television reconnaissance. Where desired, an appropriate sensor sensitive to the radiation emitted by the laser or lasers may be used to receive reflected radiation and convert it to an electrical output which will consequently carry information in accordance with the varying characteristics of the reflected radiation as modulated by the scene being scanned.

Accordingly, this invention embodies at least one semiconducting source of coherent radiation of given optical wavelength and electronic motile means for causing controlled movement of the source whereby the radiation therefrom will scan an area in a predetermined manner. Further embodiments of the invention pertain to devices and apparatus in which such scanning means is incorporated or with which it is used.

Other advantages and utilizations of this invention will become apparent from the following description taken in connection with the accompanying drawings wherein:

FIG. 1 is a perspective view of one embodiment of the invention utilizing electrostrictive rods as motile elements;

FIG. 2 is a front elevational view of a semiconductor laser element of the type used in this invention;

FIG. 3 is a perspective view of a rotary shear piezoelectric crystal used as a motile element;

FIG. 4 is a perspective view of an embodiment of the invention employing piezoelectric crystal devices and arranged for two-dimensional scanning;

FIG. 5 is a perspective view of the invention applied to a piezoelectric crystal employing flexural motion for scanning;

Figure 7:
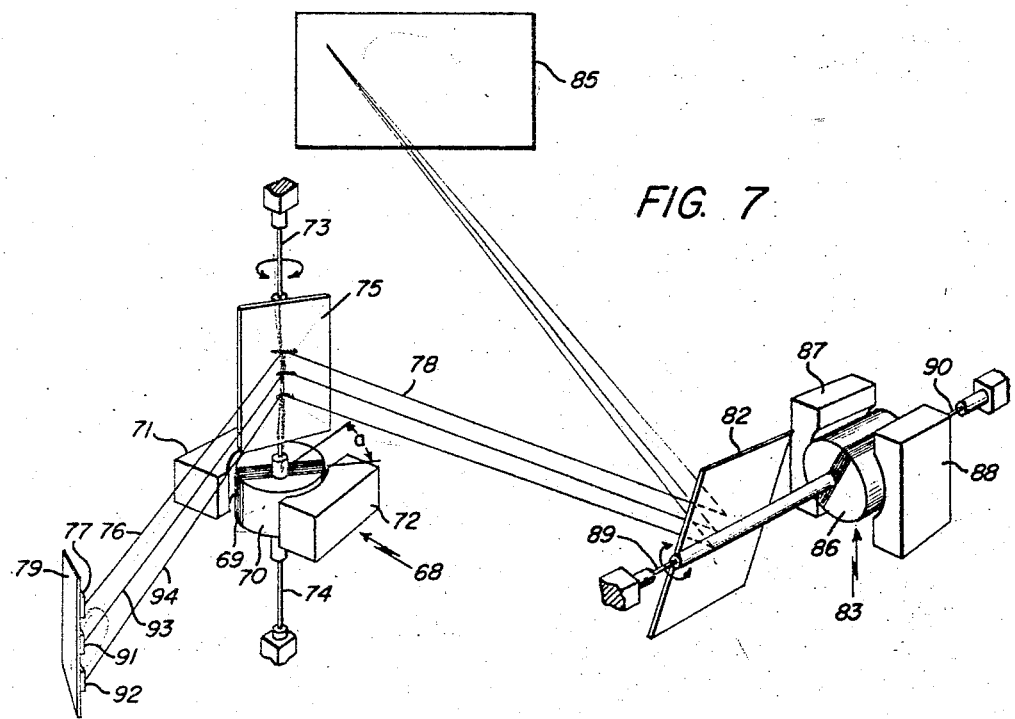
FIG. 7 is a perspective view of an embodiment of the invention using galvanometer-type deflection means and arranged for two-dimensional scanning.

Referring more particularly to the drawings wherein like characters of reference designate like parts throughout the several views, the scanning laser device depicted in FIG. 1 includes a semiconductor laser 10 which may be any known type which produces an output beam of coherent radiation of a wavelength determined by the materials from which the laser element is formed. The laser 10 is a forward-biased semiconductor diode optical maser element which efficiently converts electrical energy into coherent radiation in a portion of the optical spectrum such as at infrared or visible wavelengths. The active laser element 10 may be, for example, a gallium-arsenide diode which will emit coherent infrared radiation of about 8400 Angstroms, which is on the borderline between the red and infrared spectrum. The element may be comprised of gallium-phosphide-arsenide alloys which emits red light of about 6400 Angstroms. It may be made of indium-antimonide which emits infrared radiation of about 5 microns (50,000 Angstroms), or it may comprise other materials which are capable of emitting light of other wavelengths, as desired.

The following description of a gallium-arsenide (GaAs) diode is merely an example of one form of semiconductor laser which may be used, since this invention is intended to be applicable for use with any of the many semiconductor lasers. The GaAs diode is fabricated by diffusing zinc or cadmium into an n-type GaAs wafer 10 (FIG. 2) to produce a junction 11 in the wafer between p and n regions 12 and 13 respectively. Ohmic contacts 14 and 15 are made to the n- and p-regions by any of the well-known techniques using, typically, In, Pb-In, or Pb-In-Zn for the p-contact and Sn or Ag-Sn for the n-contact. Means (not shown) may be used for maintaining the laser diode at a predetermined temperature for efficient heat dissipation, as is well known.

Lasering action requires that two opposite surfaces of the four surfaces perpendicular to the junction 11 be flat and parallel. Accordingly, the wafer 10 is provided with end surfaces 16 and 17 which are flat and parallel to define an optical cavity therebetween.

In order to obtain radiation, the diode is biased in the forward direction, causing electrons to be injected across the junction from one type of material to the other which produces, by recombination, an intense beam of output radiation. The radiation is emitted as a narrow beam 18 parallel to the junction 11 in the direction of the flat and parallel sides, one of which may be coated with a suitable reflecting material so that the radation will be emitted only from the opposite side. The emitted radiation will be of a wavelength controlled by the materials of the diode, its temperature, and its method of preparation and operation, and is extremely intense, spatially narrow, coherent, and substantially monochromatic.

Such a laser element is, in accordance with this invention, mounted as by cementing onto an inflexible dielectric plate 19 (FIG. 1) which may have any desired configuration. Plate 19, which may be glass, is supported upon a rigid support or base 20 by means of a number of motile elements such as piezoelectric resonators or electrostrictive elements or rods 21. In the example shown in FIG. 1, plate 20 is triangular in shape and is secured at each corner to support 20 by three electrostrictive rods 21 which may be of nickel, for example. Flexible bonding means such as a rubber-like cement or a mechanical ball joint may be used to attach the ends of the rods to the plate and support.

The electrostrictive elements 21 are characterized by their ability to contract and expand when subjected to application and removal of a magnetic field. Therefore, the elements 21 are each enclosed within a magnetic coil 22 having its ends suitably connected as by leads 23, 23a and 23b respectively to sources of modulating voltage (not shown in FIG. 1). From this it will be apparent that voltages may be applied to the coils 22 successively or alternately or in any other time sequence to cause the elements 21 to expand and contract, thus physically deflecting plate 19 and thereby causing the laser beam 18 to scan the area toward which it is directed. If the motile elements 21 are controlled in proper phase, the beam 18 can be made to trace a line in space. By application of a suitable progression of signals to the elements, a rectilinear or cycloidal scan can be obtained on a surface in the path of the laser beam. For example, the beam may be arranged in aircraft so as to scan terrain over which the aircraft is flying, with any suitable detector being provided to receive the reflected radiation.

Electrical contact to the laser element 10 may be made as by two electrically conductive strips 24 and 24a of platinum, for example, which are printed, painted or otherwise applied to the surface of plate 19 and electrically connected with respective p and n regions of the laser element 10. Suitable leads 25 and 25a are suitably attached to the strips 24–24a whereby the laser element 10 may be conveniently connected to a source of modulating voltage.

Referring to FIG. 3, there is shown a device which includes a piezoelectric crystal 26 of rectangular shape which is capable of rotary shear. For purposes of this invention the crystal is considered as having two portions, a fixed or immovable portion 26a and a movable portion 26b. On one of the top longitudinal edges of movable portion 26b is disposed a contact 28 and similar contact 28a are located on both lower longitudinal edges, which contacts may be formed by suitable means such as by printing, painting or otherwise depositing strips of silver or platinum or other selected material thereon. Respective leads 29 and 29a are provided to the contacts 28 and 28a whereby they may be connected by common lead 29b to a suitable voltage supply (not shown). The third contact (not shown) is connected by lead 29d to the voltage supply and is maintained at opposite polarity.

To produce motion in the movable portion 26b of crystal 26, voltage is applied vertically across the rear side of the crystal through leads 29 and 29d, one being positive and the other negative, and simultaneously horizontally across the crystal through lower leads 29a and 29d which are reversed in polarity as shown. This causes the rear surface portion of the crystal to contract and the lower surface portion to expand, causing the movable portion 26b to bend, twist or rotate or otherwise become deformed, substantially as illustrated in solid lines in FIG. 3, from the initial normal flat shape shown in dotted lines.

A semiconductor laser element 30 is mounted on or in one surface of the movable portion 26b of the crystal 26 and is adapted to move with portion 26b. Printed or painted strips 30a and 30b on the crytsal surface provide contacts to the respective p- and n-regions of the laser element 30 for producing a beam 31 of radiation. Beam 31 emanates from the laser element 30 in a direction substantially perpendicular to the surface of the crystal when no voltage is applied to the crystal. However, when voltage is applied and crystal portion 26b is moved, the beam 31 will be tilted to the position designated 31a in FIG. 3, defining or tracing a path throughout angle x.

The crystal 26 may be suitably mounted on a fixed support 32 by cementing or otherwise securing the immovable portion 26a to the support, thus leaving movable portion 26b free to rotate.

Two-dimension scan may be obtained by using two rotary shear crystals 35 and 36, as shown in FIG. 4. Crystal 35 is mounted by its immovable end portion 37 upon a fixed base or support 38, and to its movable portion 39 is affixed the fixed portion 40 of the second crystal 36, crystal 36 extending at a right angle to crystal 35, as shown. The crystals 35–36 may be attached to and insulated from each other, if desired, by means such as a nonconductive cement. On the exposed flat surface of the movable portion 41 of second crystal 36 is located a semiconductor laser 42, similar to the laser structure shown in FIG. 3, to which are cemented terminals or contacts 47 and 47a. The crystals 35 and 36 are each provided, similar to crystal 26 on FIG. 3, with three metallic contacts on their respective movable portions, which contacts are connected by leads to a suitable voltage source so that the movement of the movable portions will be effected as described in connection with the FIG. 3 device.

To achieve two dimensional scan similar to the formation of a raster in a conventional television picture tube or kinescope, a voltage will be applied to one of the crystals, crystal 35 for example, via leads 44, whereupon the movable portion 39 will rotate slightly in the direction indicated by arrow 45. This will consequently simultaneously tilt the entire crystal 36 superimposed thereon. Application of voltage to crystal 36 via lead 44b will rotate portion 41 thereof as indicated by arrow 46. Thus, by proper progression of signal voltages to the crystals, the laser 42 will accordingly move to direct its emitted beam in controlled paths so as to completely scan an area. Laser 42 may be modulated by a suitable source (not shown) which is connected to the respective p and n regions via strips 47–47a. For instance, to form a television-like raster, crystal 36 may be acted upon to cause the beam to make one lateral scan, at the completion of which it will return the laser 42 to its initial position. As this return is being effected, however, crystal 35 may be acted upon to move the second crystal 36 and the laser thereon the slight amount which is necessary to permit the laser beam on the next scan to trace a path parallel and adjacent the first scan. These sequences may be repeated to the extend required, after which the crystals may both be returned to their initial shapes and positions by removal of voltages from the crystals.

FIG. 5 illustrates a piezoelectric crystal employing flexural motion to scan a semiconductor beam of radiation over an area. Crystal 130 is a flat rectangular body which carries contacts on all four of its longitudinal edges, the upper contacts being indicated by numerals 131 and 132 and the visible lower contact by numeral 133. The contacts preferably do not extend opposite the end portion of the crystal upon which lies the laser element 134. In accordance with this invention a negative potential from any suitable source is applied through leads 135 to contacts 132 and 133 while simultaneously a positive potential is applied through leads 136 to contact 131 and to the fourth contact (not shown). This causes the upper surface of the crystal to contract as shown by arrows 137 while the lower surface expands (see arrows 138). This causes the crystal to bend as shown, moving the laser element 134 and causing its emitted beam to scan a predetermined path. The laser element 134 may, if desired be located on end surface 139 of the crystal.

Figure 6:
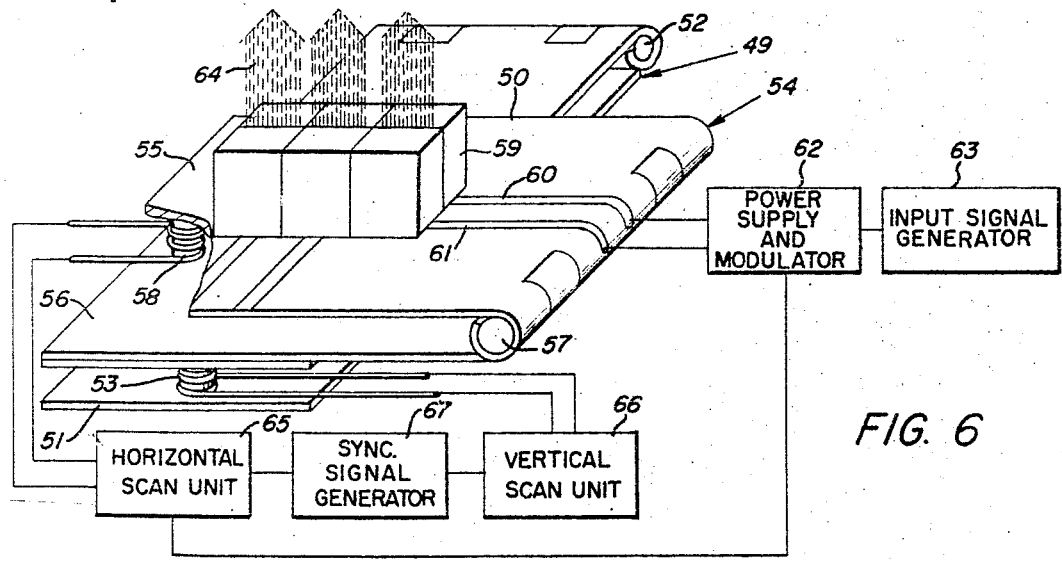
FIG. 6 is a perspective view of an embodiment of the invention employing electrostrictive rods and arranged for two-dimensional scanning.

In FIG. 6 there is shown a two-dimensional scan device utilizing electrostrictive rods as the motile elements similar to the rods described in connection with the structure of FIG. 1. In this device a hinge 49 has first and second blades 50 and 51 connected at their open ends opposite pintle 52 by at least one electrostrictive rod 53. Mounted on the outer surface of leaf 50 is a second hinge 54 the blades 55 and 56 of which are connected at their open ends opposite pintle 57 by one or more electrostrictive rods 58. On the outer surface of blade 55 is located a semiconductor laser element 59 similar to element 10 in FIG. 1. The hinges are preferably formed of dielectric material and blade 55 of hinge 54 is provided with conductive metallic strips 60 and 61 electrically connected with the respective p and n portions of the laser element. Strips or conductors 60–61 are each connected by suitable leads to a power supply and modulator device 62 which is adapted to receive an input signal from soure 63 and to transmit the signal in modified or modulated form to the element 59 to produce a modulated beam 64 of radiation.

Scanning of beam 64 is accomplished by applying a signal from the horizontal scan unit 65 to the electrostrictive rod or rods 58 to cause the hinge blade 55 to move with respect to blade 56. This will consequently move the laser element 59 and cause beam 64 to scan along a predetermined path and to return along the same path.

However, to provide scanning in a second dimension, the vertical scan unit 66 is utilized to effect operation of electrostrictive rod or rods 53 to move blade 50 of hinge 49 with respect to blade 51. This will move hinge 54 and the laser element 59 thereon to the extent necessary to direct the beam 64 along a second path parallel and relatively close to the first path. Continued repetition of these sequences will cause the radiated beam to scan over an area similar to the method in which a raster is formed in a cathode ray tube.

It will be apparent that the vertical scan unit 66 must be suitably synchronized with horizontal scan unit 65 through sync generator 67 so as to progressively move the laser element step-by-step at the end of each horizontal sweep of beam 64, and that the laser modulator 62 should be suitably keyed to the scan units so as to prevent illumination of the scanned area upon reverse travel of the laser element. However, these operations comprise systems found in conventional television picture reproduction. Therefore, no further explanation is believed necessary herein.

In accordance with this invention the motile elements may also take the form of galvanometer-type devices. One type of galvanometer device is shown and described on pages 4–55 and 4–56, Chapter 5, of "Handbook of Physics" by Condon and Odishaw, published by McGraw-Hill Book Company, Inc. in 1958. An embodiment of the present invention which employs some of the principles of galvanometry is shown in FIG. 7 and includes a first reflecting system 68 which comprises a coil 69 supported by a soft iron core 70 positioned between the poles 71–72 of a permanent magnet. The coil 69 is suspended in the magnetic field between the poles and the core 70 is mounted coaxially with cylindrical inner surfaces of the poles to insure that the magnetic field in the neighborhood of coil is radial.

When current is made to flow through the coil 69, the resultant magnetic field forces cause deflection or rotation of the coil from its equilibrium position (with no current flowing), the degree of deflection being dependent upon the amount of the current flowing through the coil. A pair of taut suspension members 73 and 74 suspend the coil within the magnetic field at a predetermined angle $a$ with respect to the pole pieces. At least one of the members 73 or 74 furnishes a restoring torque to return the coil to its equilibrium position in the absence of current flow. The members 73 and 74 function also as current leads whereby signals in the form of current variations may be applied to the coil to cause it to rotate about an axis formed by the coaxially aligned members 73 and 74.

The suspension members 73 and 74 are thin wires of ribbons of noncorrosive metal, such as gold or phosphor bronze, for example, and one thereof carries a mirror 75 which is adapted to rotate with and about the axis of the aligned motile members 73–74, which rotary movement is indicated by arrows in FIG. 7. Thus, when a signal is applied to the element or member 73 which carries mirror 75, the resulting current flow through the coil 69 will rotate both the member 73 and the mirror 75. Thus, a light beam impinging upon the mirror while the mirro is moving will, by reflection, be made to scan along a given horizontal path. For example, a beam of light 76 from a semiconductor laser element 77 directed upon the mirror 75 will be reflected as a beam 78 toward a remote area, and will scan a horizontal path across the area as the mirror rotates.

Laser element 77 may be constructed in the manner described in connection with FIG. 2 and is mounted on a fixed rigid support 79 of insulating material. Conductive strips on the support may be provided for electrically connecting the n and p regions to a source of power (not shown).

To provide two-dimensional scan, the reflected beam 78 is made to impinge upon a second mirror 82 which is mounted upon a second galvanometer-type system 83 similar to system 68 except that the horizontal axis thereof is disposed substantially perpendicular to the axis of system 68 so that the mirror 82 will rotate about the horizontal axis. Thus reflected beam 78 impinging upon the mirror 82 will again be reflected as beam 84 toward a target such as screen 85, for example. With such a device, beam 84 will horizontally scan the screen 85 as mirror 75 rotates and will scan vertically as mirror 82 rotates.

System 83 preferably comprises, as system 68, a coil 86 disposed in a magnetic field between poles 87 and 88 and is supported at the ends by motile elements 89 and 90 respectively which provide leads for supplying current to the coil from a suitable energy source (not shown) whereupon the coil will be deflected within the magnetic field. The mirror 82 is suitably mounted on motile element 89 for rotation therewith as indicated by the arrow.

It will be apparent without further explanation, that signals may be applied to the coils 69 and 86 in a manner similar to their application to deflection coils used in television picture forming, to cause the beam from laser element 77 to scan a raster over screen 85 so that an infrared or visible picture or pattern may be formed thereon as in a television picture tube, for example.

In further accordance with this invention, images may be formed having colors or different shades of a color by the use of a plurality of semiconductor lasers capable of emitting radiation of different wavelengths and by directing their beams of radiation onto a screen or target which is responsive to the different wavelengths of the radiation. In such a structure, the rigid support 79 carries a plurality of laser elements such as indicated by numerals 91 and 92 in FIG. 7. Laser elements 91 and 92 and previously described laser element 77 all emit radiation of different wavelengths. For example, one laser element may be a gallium-arsenide semiconductor element which emits infrared light at about 8400 Angstroms; the second may comprise gallium-phosphide-arsenide which emits radiation at about 6400 Angstroms; and the third may be of indium-antimonide which emits at about 5000 Angstroms.

All three laser elements are located so as to focus upon a common focal spot on screen 85, as shown, the screen being comprised of radiation sensitive luminescent phosphor particles capable of luminescing when impinged by radiation of the particular wavelengths of the emissions from the respective laser elements. Such screens are well known and need no explanation here.

The scanning systems 68 and 83 function as described above to scan the radiated beam 76, 93 and 94 over the screen and the laser elements are operated in accordance with an applied signal to produce a pattern of emission as in conventional color television, for example. For the purpose of connecting laser elements to such a signal source (not shown) the support 79 is provided with conductive strips as described above for the laser elements whereby leads from such a source may be attached in any suitable manner. Thus, an image in colors or shades may be formed on the screen 85.

It is to be understood, however, that if desired the support 79 which carries the laser elements in the structure of FIG. 7 may be mounted for rotation in place of the mirror 75. This may be easily done and eliminates the necessity for mirror 75 and also eliminates one fold in the optical path of the system. It is necessary, of course, to properly space the laser elements with respect to mirror 82 and screen 85 so as to provide a common focal spot on the screen 85.

Figure 8:
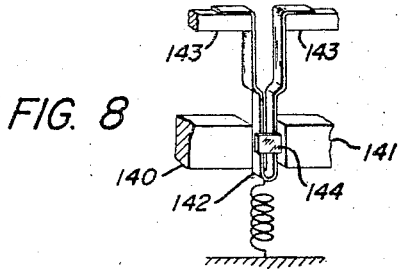
FIG. 8 is a perspective view of one form of a ribbon galvanometer structure utilizable in the invention.

In FIG. 8 there is very schematically shown another embodiment of the invention wherein is employed a ribbon galvanometer of the type used in a recording (direct writing) oscillograph, for example, such as offered for sale by Century Electronics and Instruments, of Tulsa, Oklahoma. Briefly, this structure embodies two spaced pole pieces 140–141 between which is created a magnetic field in which is suspended, at an angle, a loop of metal ribbon 142 which is affixed at its free upper ends to fixed supports 143. The loop 142 has a mirror 144 thereon which is adapted to receive and reflect one or more beams of radiation from a laser device. It will be apparent without more explanation that a galvanometer device of this type may be substituted in the system of FIG. 7.

Figure 9:
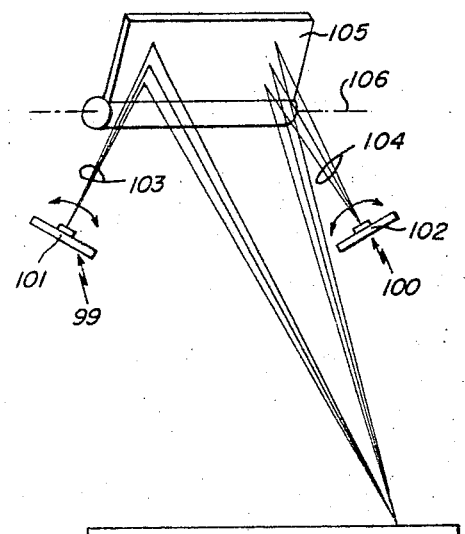
FIGS. 9 and 10 are two views of a single-fold optical system obtained by a two-dimensional rapid flyback scan device in accordance with this invention.
Figure 10:
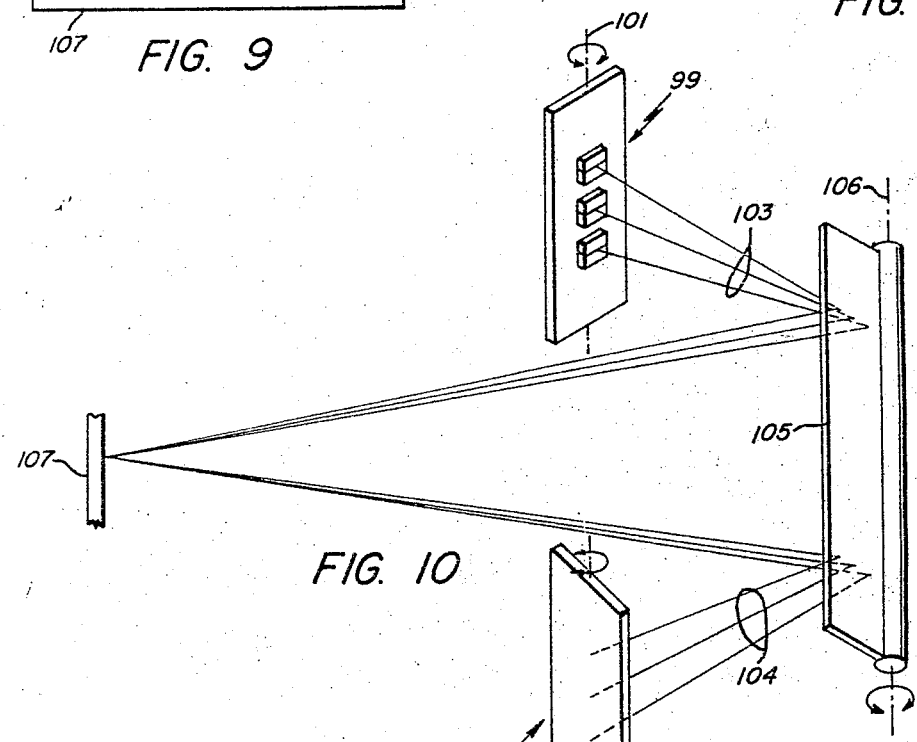

One problem which might occur in a system of the type described herein is that of providing rapid flyback, that is, fast return of the device from the end of one horizontal traverse to the starting point of the next so that no undesirable lag occurs during this period. This problem may be overcome by providing a system such as is schematically or diagrammatically shown in FIGS 9 and 10. In this arrangement two separate laser units 99 and 100 are provided, each unit comprising one or more laser elements mounted on a suitable dielectric support as shown in FIG. 6. In the structure of FIGS. 9 and 10, however, each laser 99 and 100 unit is mounted for rotation about a respective vertical axis 101 and 102 respectively. Such rotation may be accomplished by either the galvanometer method as described in connection with FIG. 7 or by use of electrostrictive rods or piezoelectric crystals as shown in other embodiments described above.

Beams 103 and 104 emitted from the units are directed onto a mirror 105 which is mounted for rotation about a horizontal axis 106 by any of the above-described means, the mirror reflecting the beams 103–104 to a common focal point on remote screen 107.

To compensate for lack of rapid flyback, the two units are adapted to operate sequentially or alternately so that one unit will operate while the second is returning to normal position after the completion of a horizontal scan.

If the laser units are mounted on rotary shear or flexural type piezoelectric crystals of the type shown in FIGS. 3–5, for example, the crystals may be picked to have a resonance frequency well above the 15.5 kilocycle frequency desired for horizontal scan and thus can be driven to give a linear scan with time. The drive for scan may be obtained by applying an electrical potential to a crystal, while the return is accomplished by loading the crystal terminals with a resistive or capacitive load with no voltage applied. Circuitry to accomplish this is not shown but is conventional.

Figure 11:
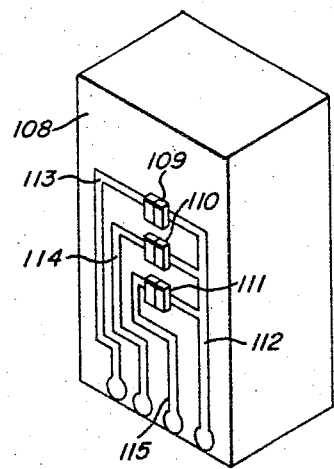
FIG. 11 is a perspective view of a rotary shear piezoelectric crystal supporting a plurality of semiconductor laser elements.

Referring now to FIG. 11 there is shown a crystal 108 having three semiconductor laser elements 109–110–111 thereon. Each element is electrically connected by its n or p area to one common lead 112 which is provided by evaporating, painting or otherwise affixing a conductive strip thereon of platinum or other selected conductive material. The p and n regions of opposite conductivity of the respective elements are connected to separate conductive strips 113–114–115. Thus, the entire plurality of laser elements may be readily connected into a circuit by attaching leads to terminals at the ends of the strips.

It will be apparent from the foregoing that novel means have been described for providing scansion of a light beam over a selected area. Modifications may be made by those skilled in the art, however, without departing from the spirit of the invention as expressing the accompanying claims.

What is claimed is:

1. A device for electronically scanning a beam of radiation along a predetermined path comprising a support, a semiconductor laser element on the support and insulated therefrom and having regions of opposite conductivity, conductors connected with the respective regions of opposite conductivity for supplying power to the laser element for generation of an output beam of radiation, a base, at least a major portion of the support being spaced from said base, at least one electro-strictive rod connecting the support to the base, and a coil encircling said rod, the rod being expandable and contractable in response to variations in current passing through the coil, the changes in size of the rod resulting from such expansions and contractions moving the support and laser element with respect to the base to cause scansion of the beam along a predetermined path.

2. A device for electronically scanning a beam of radiation along a predetermined path comprisng a hingelike structure embodying a first and second spaced plates hinged together adjacent one end, at least one electrostrictive rod connecting portions of the plates remote from the hinged ends thereof, a semiconductor laser element insulatedly mounted on said first plate and having regions of opposite conductivity, means for connecting said regions of opposite conductivity to a source of power for generation of a beam of radiation, a coil encircling said rod, and means for connecting said rod to a source of current, said rod being expandable and contractable in response to variations in current passing through the coil to move the first plate and laser element thereon to cause the beam of radiation to scan in a given direction along a predetermined path.

3. A device as set forth in claim 2 for two-dimensional scanning comprising a second hingelike structure embodying first and second spaced plates hinged together adjacent one end, the first structure being fixedly attached to the first plate of the second structure, at least one electrostrictive rod connecting portions of the plates of the second structure remote from their hinged ends, a coil encircling said last-named rod, and means for connecting said last-named coil to a second source of current, said last-named rod being expandable and contractable in response to variations in current passing through its encircling coil to move the first plate of the second structure, the first structure, and the laser element to cause the beam of radiation to scan in second direction.

4. A device as set forth in claim 3 wherein a plurality of laser elements are located on the first plate of the first hingelike structure in adjacent relationship to one another, said laser elements emitting beams of respectively different wavelengths directed to a common focal point, and a screen is positioned in the focal plane of said beams, said screen comprising areas sensitive to the wavelengths of the respective beams and luminescent in response thereto.

5. A device for electronically scanning a beam of radiation along a predetermined path comprising a galvanometer system embodying a pair of spaced opposite magnetic poles, a core within the magnetic field created by the poles and having a current-sensitive coil thereon, and at least one torsion suspension element conductively attached to said coil and rotatable about its own longitudinal axis, a first mirror mounted on the suspension element and movable therewith, a plurality of laser elements positioned in adjacent relation to one another and located to direct radiation therefrom onto said first mirror, said elements and operable to emit beams of radiation of respectively different wavelengths directed to said first mirror, means for connecting said regions to a source of power for generation of said beams of radiation, means for connecting said suspension element and coil to a source of current, said coil, suspension element and mirror being movable about the longitudinal axis of the suspension element in response to variations in current passing through the coil to cause said beams of radiation to scan along a predetermined path in a given direction, a second galvanometer system located adjacent said first system and extending substantially perpendicular thereto, said second galvanometer system embodying a second pair of spaced opposite magnetic poles, a core within the magnetic field created by the poles and having a current-sensitive coil thereon, and at least one torsion suspension element conductively attached to said coil and rotatable about its own longitudinal axis, a second mirror mounted on the suspension element of the second galvanometer system in the path of said beams of radiation after reflection from said first mirror, said second mirror being movable with the coil and suspension element of the second system about the longitudinal axis of the second suspension element to deflect the beams of radiation along a second direction of scan, and a screen positioned in the path of the beams of radiation after reflection from said second mirror, said screen comprising areas sensitive to the wavelengths of the respective beams of radiation and luminescent in response thereto.

References Cited

UNITED STATES PATENTS

| | | | |
|---|---|---|---|
| 1,725,710 | 8/1929 | Hammond | 178—7.6 |
| 1,760,198 | 5/1930 | Hough | 178—7.6 |
| 2,920,529 | 1/1960 | Blythe | 88—61 |
| 2,962,647 | 11/1960 | Douglas | 178—7.81 |
| 3,123,714 | 3/1964 | Chope | 250—199 |

JOHN W. CALDWELL, *Acting Primary Examiner.*

J. A. ORSINO, *Assistant Examiner.*